United States Patent
Fuentes et al.

(10) Patent No.: US 12,006,741 B2
(45) Date of Patent: Jun. 11, 2024

(54) VEHICLE HOOD LEVER ASSEMBLY

(71) Applicants: Nissan North America, Inc., Franklin, TN (US); NISSAN MOTOR CO., LTD., Yokohama (JP)

(72) Inventors: Bobby Fuentes, Novi, MI (US); Takeharu Iwata, Atsugi (JP)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 486 days.

(21) Appl. No.: 17/243,237

(22) Filed: Apr. 28, 2021

(65) Prior Publication Data
US 2022/0349224 A1 Nov. 3, 2022

(51) Int. Cl.
*B62D 25/12* (2006.01)
*E05B 83/24* (2014.01)

(52) U.S. Cl.
CPC ............ *E05B 83/243* (2013.01); *B62D 25/12* (2013.01)

(58) Field of Classification Search
CPC ...... E05B 83/243; E05B 85/243; E05B 77/02; B62D 25/12
USPC ..... 292/DIG. 14, 216, 194; 296/193.11, 180, 296/69.2, 69.22, 62 D, 25, 105 B, 12
See application file for complete search history.

(56) References Cited

U.S. PATENT DOCUMENTS

| | | | |
|---|---|---|---|
| 2,193,132 A * | 3/1940 | Hynes | E05B 83/247 292/214 |
| 5,348,355 A | 9/1994 | Oyha | |
| 9,187,936 B2 | 11/2015 | Kim et al. | |
| 10,703,427 B2 | 7/2020 | Stevens | |
| 2020/0071971 A1 | 3/2020 | Cho et al. | |

FOREIGN PATENT DOCUMENTS

| | | |
|---|---|---|
| KR | 1999-007107 U | 2/1999 |
| KR | 20-0332018 Y1 | 10/2003 |
| KR | 10-0520966 B1 | 10/2005 |
| KR | 10-1282792 B1 | 7/2013 |
| KR | 10-2018-0070396 A | 6/2018 |

* cited by examiner

*Primary Examiner* — Kristina R Fulton
*Assistant Examiner* — Thomas L Neubauer
(74) *Attorney, Agent, or Firm* — Global IP Counselors, LLP (57) ABSTRACT

A vehicle hood lever assembly has a latch mechanism, a latch lever and a striker structure. The latch mechanism has a latching member movable between a hood locking orientation and a hood unlocking orientation. The latch lever attaches to the latch mechanism at a location spaced apart from the latching member movable between a hood catching orientation and a hood release orientation. The striker structure has a main striker member and a secondary striker member. With the striker structure moving toward the latch mechanism, a surface of the secondary striker member contacts a portion of the latch lever moving the latch lever from the hood release orientation to the hood catching orientation. In response to continued movement of the striker structure toward the latch mechanism, the main striker member engages the latching member and is restrained against further movement with the latching member being moved into the hood locking orientation.

17 Claims, 8 Drawing Sheets

VEHICLE HOOD LEVER ASSEMBLY

BACKGROUND

Technical Field

The present disclosure generally relates to a vehicle hood lever assembly. More specifically, the present disclosure relates to hood lever assembly having a secondary striker member that contacts a cam surface of a latch lever as a vehicle hood is being closed causing the latch lever to move from a hood release orientation to a hood catching orientation.

Background Information

The hood of a vehicle is typically locked in a closed orientation by elements of a hood latch mechanism.

SUMMARY

One object of the present disclosure is to provide a striker structure with a cam surface that contact a cam surface of a latch lever causing the latch lever to move from a hood release orientation to a hood catching orientation during a vehicle hood closing operation.

In view of the state of the known technology, one aspect of the present disclosure is to provide a vehicle hood lever assembly that includes a latch mechanism, a latch lever and a striker structure. The latch mechanism has a latching member movable between a hood locking orientation and a hood unlocking orientation. The latch lever is attached to the latch mechanism at a location spaced apart from the latching member and is movable between a hood catching orientation and a hood release orientation. The striker structure has a main striker member and a secondary striker member. The secondary striker member is spaced apart from the main striker such that with the striker structure moved toward the latch mechanism a surface of the secondary striker member contacts a portion of the latch lever moving the latch lever from the hood release orientation to the hood catching orientation. In response to continued movement of the striker structure toward the latch mechanism, the main striker member is configured to engage the latching member and be restrained against further movement with the latching member moved into the hood locking orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
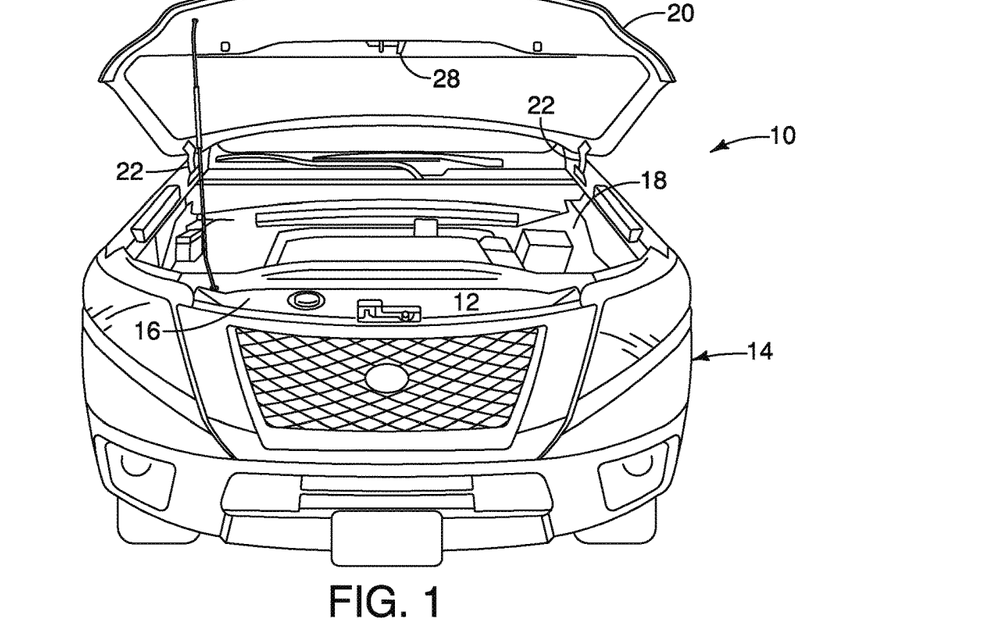
FIG. 1 is a front view of a vehicle having vehicle body structure with a hood shown in an open position exposing an engine compartment, a hood lever assembly located forward of an engine compartment and a striker structure installed to a forward end of the hood in accordance with an exemplary embodiment.

Referring initially to FIG. 1, a vehicle 10 that includes a vehicle hood lever assembly 12 is illustrated in accordance with a first embodiment.

The vehicle 10 includes a vehicle body structure 14 that includes a front end structure 16 that at least partially defines an engine compartment 18 within the vehicle structure 14. The vehicle body structure 14 further includes a hood 20 that is installed to the vehicle body structure 14 by hinges 22 and is movable between an open position exposing the engine compartment 18 and a closed position relative to the vehicle body structure that conceals the engine compartment 18.

Figure 2:
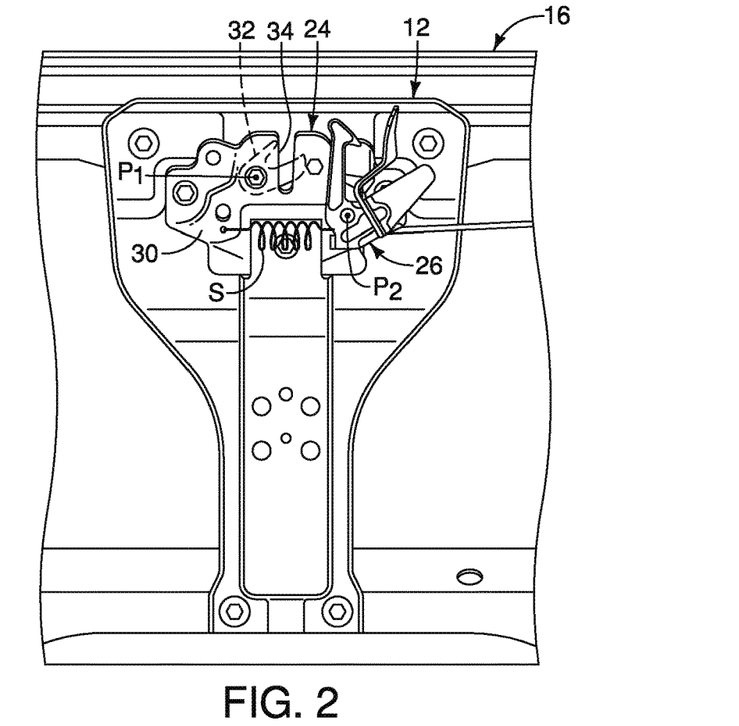
FIG. 2 is a front view of the hood lever assembly having a latch mechanism and a latch lever in accordance with the exemplar embodiment.
Figure 3:
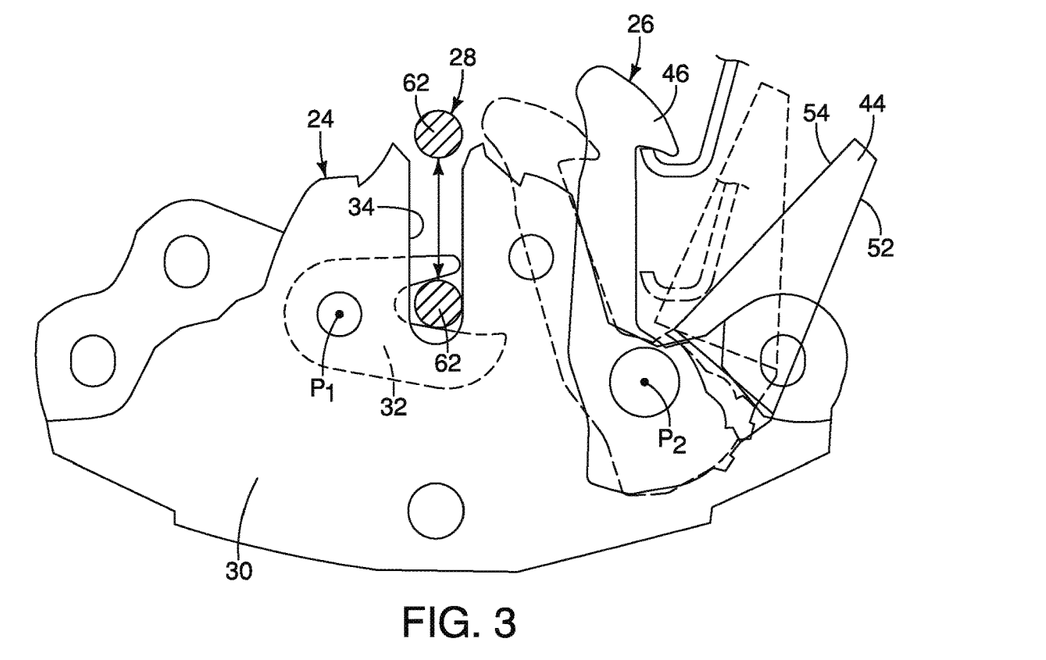
FIG. 3 is a front view of the latch mechanism showing the latch lever in a hood release orientation (in phantom) and a hood catching orientation (solid lines) in accordance with the exemplary embodiment.
Figure 4:
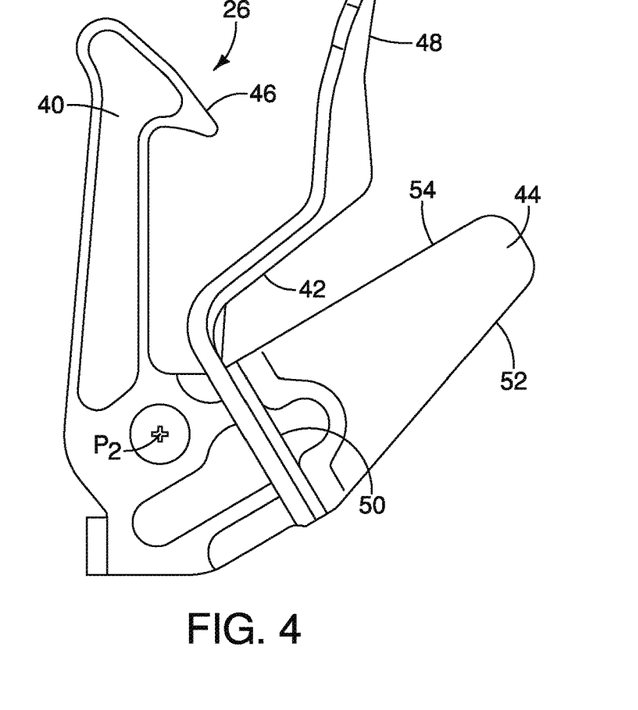
FIG. 4 is a front view of the latch lever removed from the latch mechanism in accordance with the exemplary embodiment.

As shown in FIGS. 1, 2 and 3, the vehicle hood lever assembly 12 includes a latch mechanism 24 (FIGS. 2 and 3), a latch lever 26 (FIGS. 2 and 3) and a striker structure 28 (FIG. 1).

As shown in FIGS. 2 and 3, the latch mechanism 24 includes a support plate 30, a latching member 32 and the latch lever 26. The support plate 30 is attached to the front end structure 16 of the vehicle body structure 14 such that the latch mechanism 24 is at a positioned adjacent to and forward of the engine compartment 18. However, it should be understood from the drawings and the description herein that the latch mechanism can be positioned at any location about the engine compartment 18, in particular in vehicle designs where the hood 20 is oriented to pivot about hinges located at the front or a lateral side of the engine compartment 18.

The support plate 30 is formed with a vertically oriented slot 34. The latching member 32 is attached to the support plate 30 for pivotal movement between a hood unlocking orientation shown in FIG. 2 and a hood locking orientation shown in FIG. 3 trapping a main striker member 62 (described below) and securing the hood 20 in the closed position. The latching member 32 pivots about a first pivot pin $P_1$ that secures the latching member 32 to the support plate 30 for pivotal movement. The latching member 32 also includes a slot such that with the support plate 30 in the hood unlocking orientation shown in FIG. 2, the hood 20 can be opened and in the hood locking orientation shown in FIG. 3 the hood 20 is retained in a locked and closed position.

The latch mechanism 24 includes a release mechanism (not shown) that retains the latching member 32 in the hood locking orientation until released by a vehicle operator (not shown) in a conventional manner. Since latching members 32 and corresponding release mechanism are conventional features well known in the art, further description is omitted for the sake of brevity.

A description of the latch lever 26 is now provided with specific reference to FIGS. 3-6. The latch lever 26 is attached to the support plate 30 of the latch mechanism 24 by a second pivot pin $P_2$ such that the latch lever 26 pivots about the second pivot pin $P_2$, as shown in FIGS. 2 and 3. The second pivot pin $P_2$ is spaced apart from the first $P_1$.

The latch lever 26 includes a hook portion 40, a lever portion 42 and a cam member 44. The hook portion 40 is generally flat or planar but can include a rigidifying rib or ribs. The lever portion 42 has a meandering shape that extends generally in a direction perpendicular to the hook portion 40 and forward from the hook portion 40 relative to the vehicle 10. In the depicted embodiment, the hook portion 40 and the lever portion 42 are made from a single metallic plate-like material that is bent and shaped to define the hook portion 40 and the lever portion 42.

The hook portion 40 is movable between a hood catching orientation (solid lines in FIG. 3) and a hood release orientation (dashed lines in FIG. 3) as it pivots about the second pivot pin $P_2$. The latch lever 26 has a first end 46 and a second end 48. The first end 46 is defined at the end of the hook portion 40 and the second end 48 is defined at the end of the lever portion 42. The first end 46 has a hook shape that is shaped to engage a portion of the striker structure 28, as described further below. The cam member 44 is installed to the lever portion 42 adjacent the intersection of the lever portion 42 and the hook portion 40. Specifically, the cam member 44 is attached to the lever portion 42 of the latch lever 26 and extends from an area of the latch lever 26 between the first end 46 and the second end 48. The latch lever 26 can be biased toward the hood catching orientation with the inclusion of a coil spring S, shown in FIGS. 2 and 5.

The lever portion 42 (the second end 48) of the latch lever 26 extends in a forward direction (relative to the vehicle 10) from the hook portion 40 to a location near a front edge of the hood 20, with the hood 20 in the closed position. The lever portion 42 is dimensioned and shaped such that the second end 48 can be touched and pushed by the hand of a technician or vehicle operator reaching under the hood 20 in order to fully open the hood 20.

Figure 5:
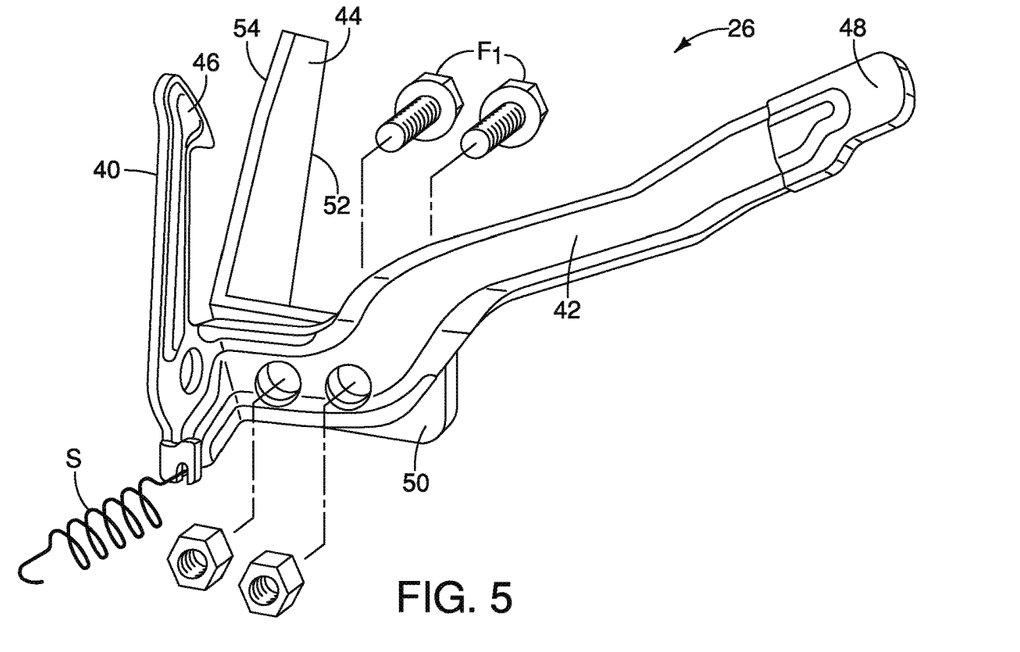
FIG. 5 is a perspective view of the latch lever removed from the latch mechanism in accordance with the exemplary embodiment.
Figure 6:
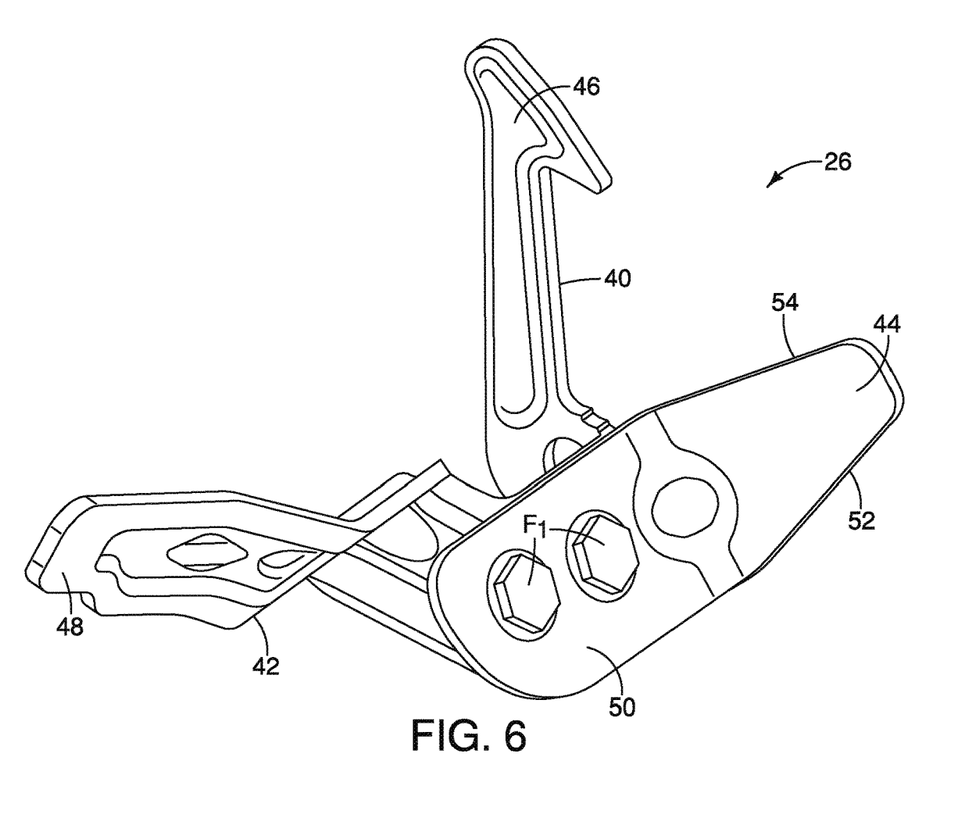
FIG. 6 is another perspective view of the latch lever removed from the latch mechanism in accordance with the exemplary embodiment.
Figure 7:
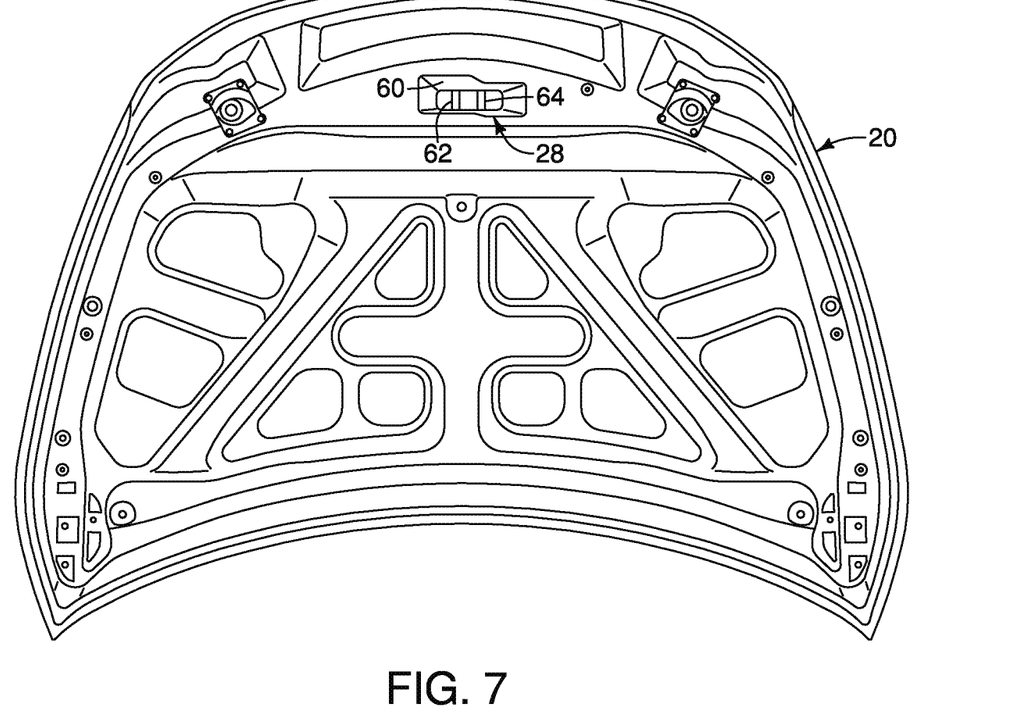
FIG. 7 is a bottom view of the hood removed from the vehicle showing the striker structure in accordance with the exemplary embodiment.
Figure 8:
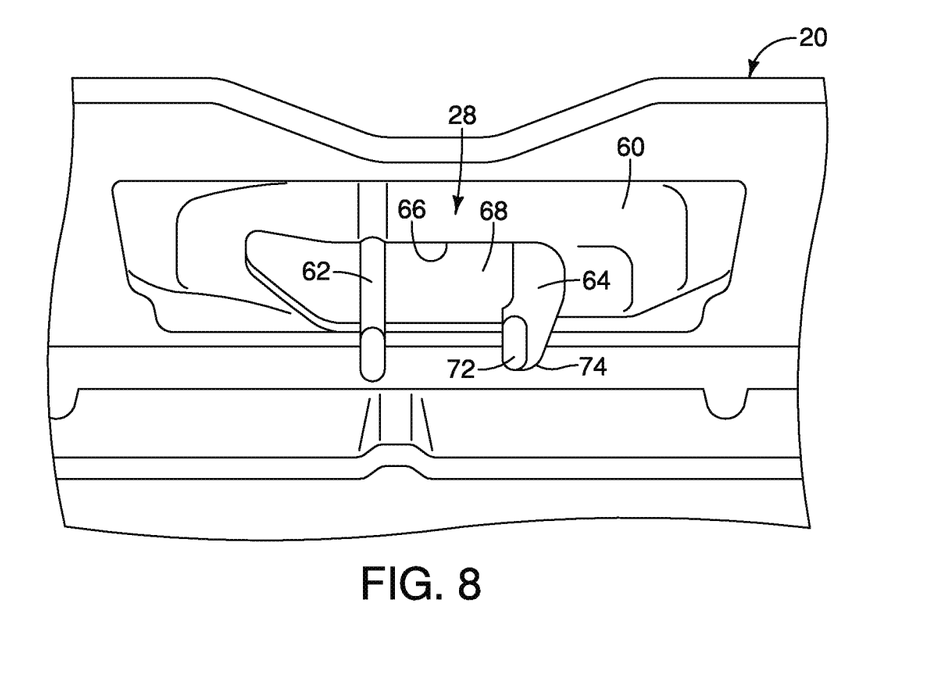
FIG. 8 is a perspective front view of a portion of the hood showing further details of the striker structure in accordance with the exemplary embodiment.
Figure 9:
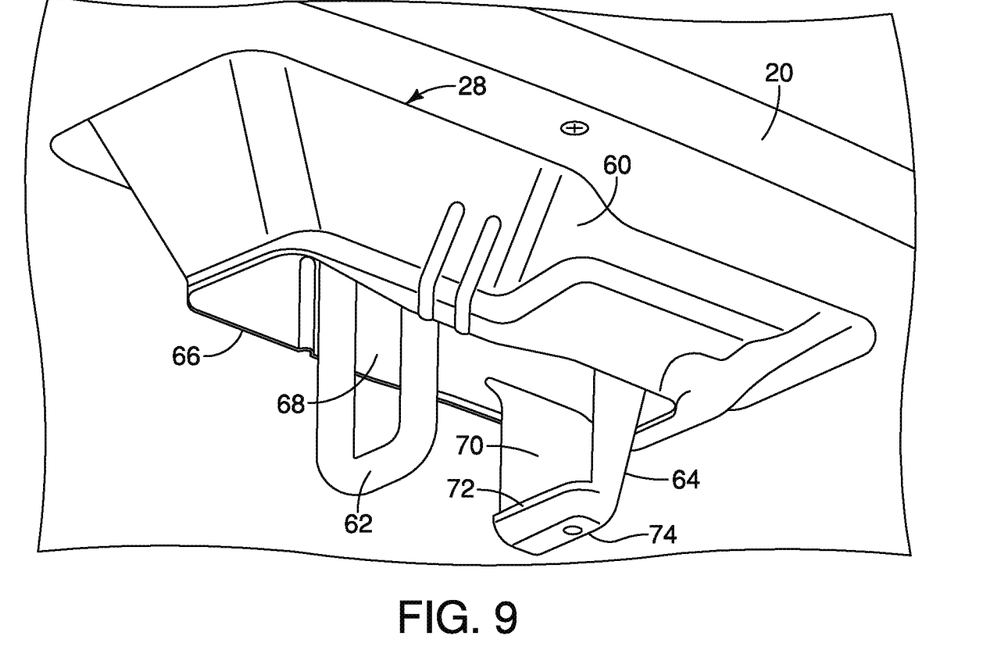
FIG. 9 is another perspective view of the striker structure in accordance with the exemplary embodiment.
Figure 10:
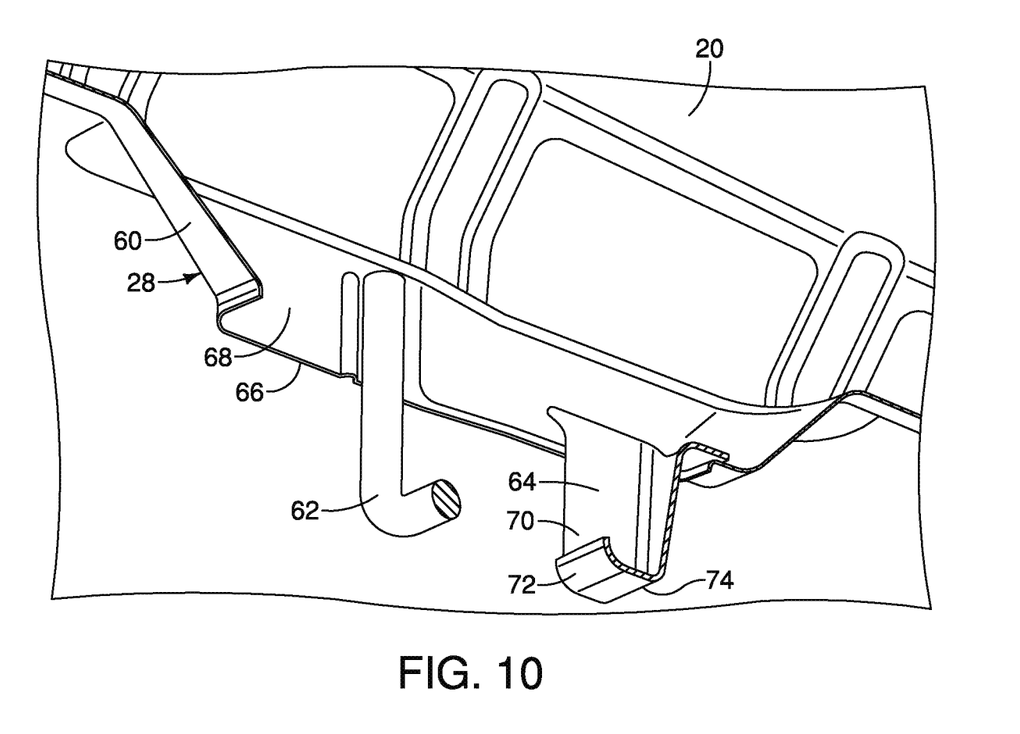
FIG. 10 is a perspective cross-sectional view of the striker structure in accordance with the exemplary embodiment.
Figure 11:
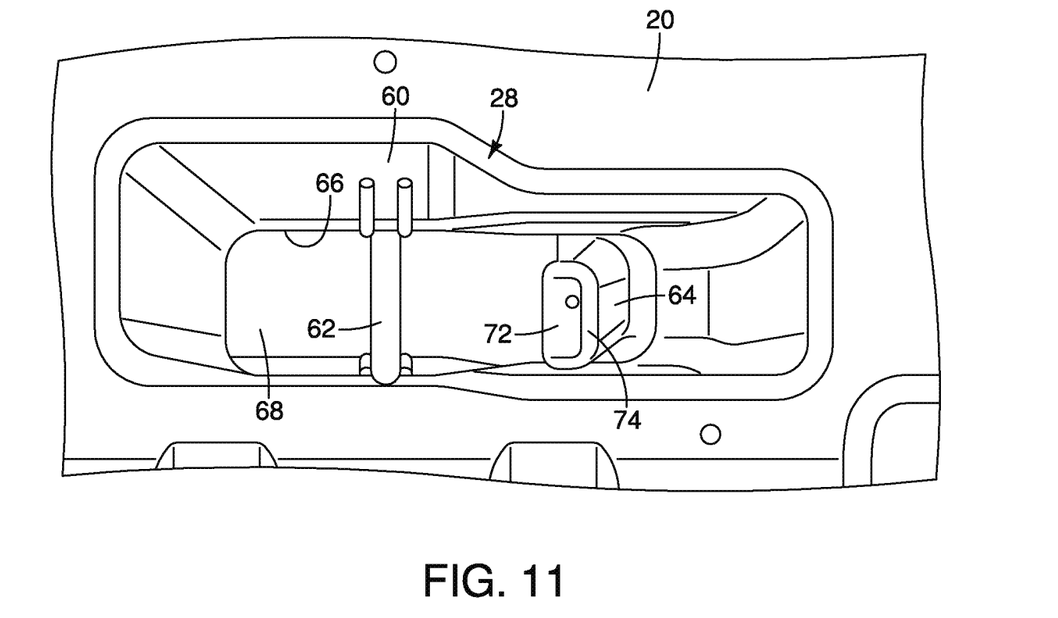
FIG. 11 is a bottom view of the striker structure in accordance with the exemplary embodiment.
Figure 12:
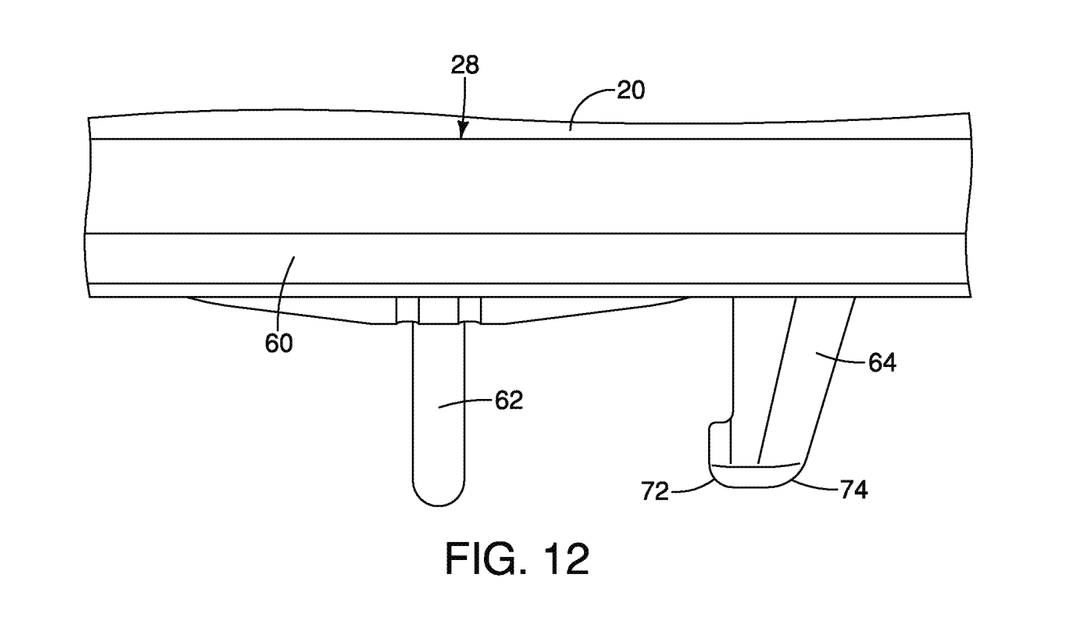
FIG. 12 is a front view of the striker structure in accordance with the exemplary embodiment.

The cam member 44 has a first section 50, a second section 52 and a cam surface 54 (also referred to as a cam edge 54). In the illustrated embodiment, the first section 50 and the second section 52 are made from a single metallic plate material that is bent or otherwise shaped such that the first section 50 is approximately perpendicular to the second section. The first section 50 is fixed to a section of the latch lever 26 by, for example, two mechanical fasteners $F_1$. Although two fasteners $F_1$ are depicted in FIGS. 5 and 6, a single mechanical fastener $F_1$ can be used to fix the first section of the cam member 44 to the lever portion 42 of the latch lever 26.

The second section 52 of the cam member 44 extends in a direction parallel to or within the same plane defined by the first end 46 (the hook portion 40) of the latch lever and is perpendicular to the lever portion 42 of the latch lever 26 and the first section 50 of the cam member 44.

As shown in FIGS. 7-12, the striker structure 28 includes a support portion 60, a main striker member 62 and a secondary striker member 64. The support portion 60 defines an opening 66 that exposes a hollow interior 68. The main striker member 62 has an overall U-shape with opposing ends of the main striker member 62 fixedly attached to the support portion 60 at opposite sides of the opening 66. Consequently, the main striker member 62 extends downward from the support portion 60 beneath the opening 66.

The striker structure 28 is configured to attach to the hood 20 for movement therewith such that the main striker 62 and the secondary striker member 64 move toward the latch mechanism 24 as the hood 20 is moved from the open position toward the closed position.

The secondary striker member 64 is attached to the support portion 60 at one lateral side of the opening 66. The secondary striker member 64 has a cup or scoop-like shape defining a hollowed area 70 with the hollowed area facing the opening 66. The secondary striker member 64 further defines a striker section 72 locate at the bottom-most area of the secondary striker member 64.

The main striker member 62 and the secondary striker member 64 are spaced apart from one another. The striker structure 28 is dimensioned and fixed at a predetermined location along an underside of the hood 20 such that as the hood 20 is moved from the open position toward the closed position, the main striker member 62 aligns with the slot 34 and the secondary striker member 62 is aligned with the latch lever 26, if the latch mechanism 24 includes the optional the spring S, then the spring S biases the latch lever 26 toward the hood catching orientation.

Therefore, simultaneously, as the striker structure 28 and the hood 20 move toward the latch mechanism 24, the striker section 72 of the secondary striker member 64 can contact a portion of the first end 46 of the latch lever 26 and moving the latch lever 26 from the hood catching orientation toward the hood releasing orientation.

Further continued movement of the hood 20 and the striker structure downward causes the main striker member 62 to contact the latching member 32 tom move toward the hood locking orientation. Simultaneously, the continued movement downward causes the striker section 72 to move downward past the first end 46 of the hook portion 40 of latch lever 26, and, further continued movement downward causes a surface 74 of the secondary striker member 64 to contact the cam surface 54 of the cam member 44, thereby ensuring moving the first end 46 of the hook portion 40 of the latch lever 26 back into the hood catching orientation.

As mentioned above, the spring S is an optional element. In other words, with the inclusion of the cam member 44, the spring S can be employed, but is no longer required for operation of the latch lever 26, as described below with specific reference to FIGS. 13 thru 22.

Figure 13:
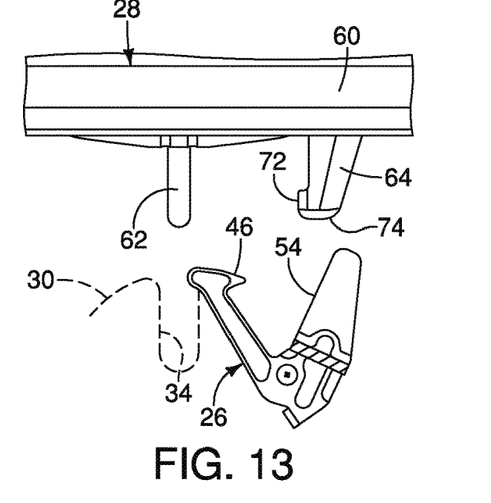
FIG. 13 is a schematic view of the hood, the latch mechanism and the striker structure showing the hood in an open orientation with the striker assembly spaced apart from the latch mechanism and the latch lever in accordance with the exemplary embodiment.

Referring to FIGS. 13-18, a description of a closing operation of the hood 20 is provided. As shown in FIG. 13, the latch lever 26 is initially shown in the hood releasing orientation since the hood 20 has previously been opened and is now about to be closed. The spring S is not shown, as it is not required, but is an optional feature. As shown by comparing FIGS. 13 and 14, as the hood 20 is moved toward the closed position, the main striker member 62 moves into the slot 34 of the latch mechanism 24 and, the surface 74 of the secondary striker member 64 contacts the cam surface 54 of cam member 44 of the latch lever 26.

Figure 14:
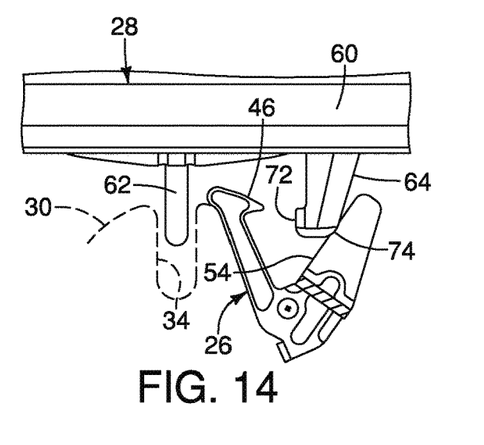
FIG. 14 is a second schematic view of the hood, the latch mechanism and the striker assembly showing the hood moved toward the closed position such that a main striker member of the striker structure enters a slot in the latch mechanism with a secondary striker member of the striker structure contacting the latch lever in accordance with the exemplary embodiment.
Figure 15:
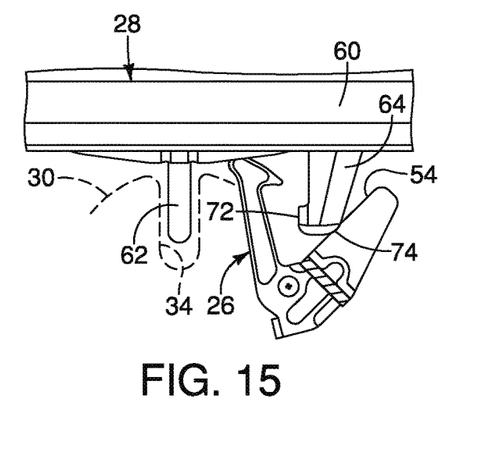
FIG. 15 is a third schematic view of the hood, the latch mechanism and the striker assembly showing the hood moved further downward toward the closed position such that the main striker member of the striker structure is moved downward within the slot of the latch mechanism with the secondary striker member pushing the latch lever away from a hood release orientation toward a hood catching orientation in accordance with the exemplary embodiment.

Comparing FIGS. 14 and 15, continued downward movement of the hood 20 causes the main striker member 62 move further into the slot 34 of the latch mechanism 24, and, the surface 74 of the secondary striker member 64 begins to push against the cam surface 54 of cam member 44 of the latch lever 26 causing the latch lever 26 to pivot from the latch release orientation toward the latch catching orientation.

Figure 16:
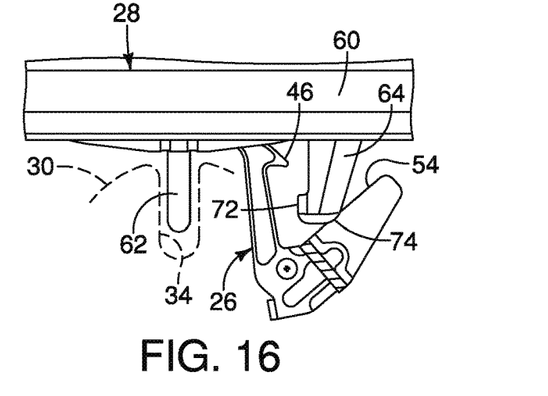
FIG. 16 is a fourth schematic view of the hood, the latch mechanism and the striker assembly showing the hood moved still further downward toward the closed position such that the main striker member of the striker structure is moved closer to a bottom of the slot of the latch mechanism with the secondary striker member pushing the latch lever further away from a hood release orientation and closer to the hood catching orientation in accordance with the exemplary embodiment.

Comparing FIGS. 15 and 16, continued downward movement of the hood 20 causes the main striker member 62 move further into the slot 34 of the latch mechanism 24, and, the surface 74 of the secondary striker member 64 pushes further against the cam surface 54 of cam member 44 of the latch lever 26 further pivoting the latch lever 26 toward the latch catching orientation. Although not shown in FIGS. 16-18, the main striker member 62 begins to contact the latching member 32 of the latch mechanism 24 and in FIG. 18, the latching member 32 of the latch mechanism 24 has moved to the hood locking orientation.

Figure 17:
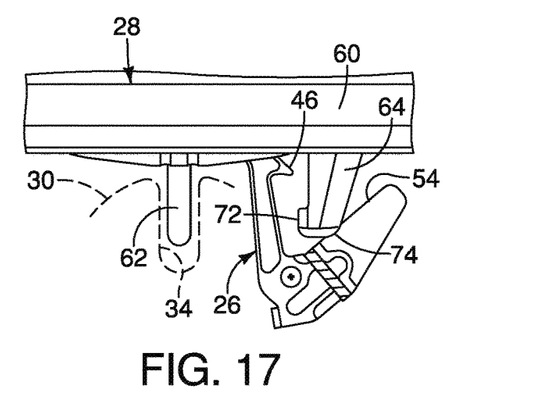
FIG. 17 is a fifth schematic view of the hood, the latch mechanism and the striker assembly showing the hood moved still further downward toward the closed position such that the main striker member of the striker structure is moved still closer to a bottom of the slot of the latch mechanism with the secondary striker member pushing the latch lever close to the hood catching orientation in accordance with the exemplary embodiment.

As shown in FIG. 17, the downward movement of the hood 20 has now caused the surface 74 of the secondary striker member 64 to push against the cam surface 54 of cam member 44 bringing the latch lever 26 very close to the latch catching orientation such that the first end 46 of the hook portion 40 is now directly above the striker section 72 of the secondary striker member 64.

Figure 18:
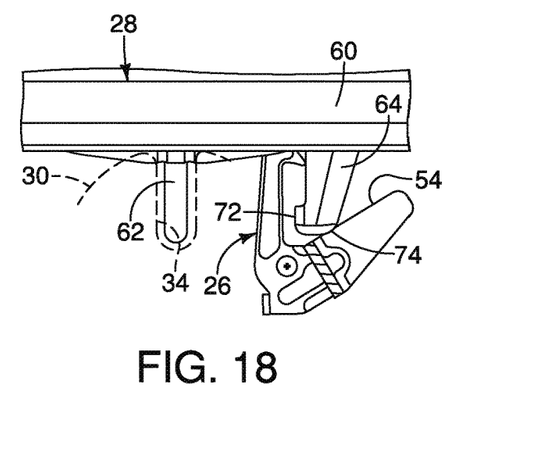
FIG. 18 is a sixth schematic view of the hood, the latch mechanism and the striker assembly showing the hood moved to the closed position, the main striker member of the striker structure moved to the bottom of the slot of the latch mechanism and to a hood locking orientation, and the secondary striker member has pushed the latch lever to the hood catching orientation in accordance with the exemplary embodiment.

As shown in FIG. 18, the downward movement of the hood 20 has now closed the hood 20 with the latching member 32 (not shown in FIG. 18) of the latch mechanism 24 fully moved to the hood locking orientation. Further, the surface 74 of the secondary striker member 64 has push against the cam surface 54 of cam member 44 bringing the latch lever 26 to the latch catching orientation such that the first end 46 of the hook portion 40 is now fully above the striker section 72 and is at least partially within the hollowed area 70 of the secondary striker member 64. Further, the first end 46 of the hook portion 40 of the latch lever 26 extends at least partially into the hollow interior 68 of the support portion 60 of the striker structure 28.

A description of the opening operation of the hood 20 is described with reference to FIGS. 19-22.

Figure 19:
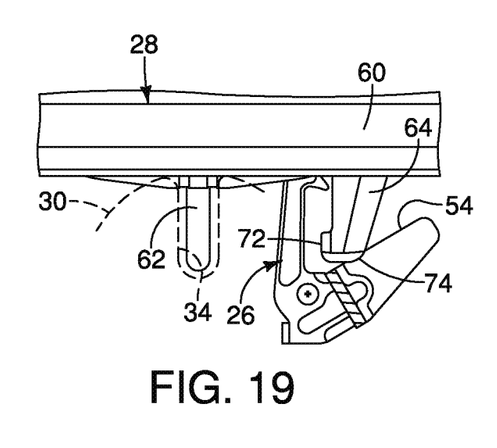
FIG. 19 is a first schematic view of the hood, the latch mechanism and the striker assembly showing steps for opening the hood from the closed position in accordance with the exemplary embodiment.
Figure 20:
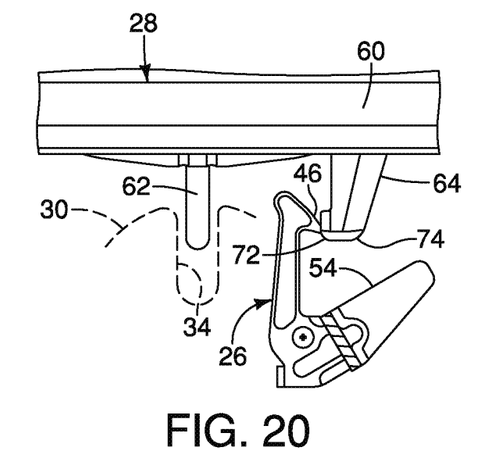
FIG. 20 is a second schematic view of the hood, the latch mechanism and the striker assembly depicting a second step for opening the hood, showing the released from the hood locking orientation with a hook portion of the latch lever in the hood catching orientation contacting the secondary striker member thereby preventing further upward movement of the hood and striker structure in accordance with the exemplary embodiment.

FIG. 19 shows the hood 20 in a closed position with the main striker member 62 held in the closed position by the latching member 32 which is in the hood locking orientation (as shown in FIG. 3). A technician or a vehicle operator operates a release mechanism (not shown) within the vehicle 10 in a conventional manner, releasing the latch member 32 so that it moves to the hood unlocking orientation thereby allowing the hood 20 and the main striker 62 to move upward due to a conventional biasing spring(s) (not shown) that pushes the hood 20 upward. In response to the upward movement of the hood 20 and the striker structure 28, the first end 46 of the hook portion 40 of the latch lever 26 contacts and held in position by the striker section 72 of the secondary striker member 64, preventing further upward movement of the hood 20, as shown in FIG. 20.

With the first end 46 of the latch lever 26 engaged with the secondary striker member 64 in the hood catching orientation (FIG. 20), the hood 20 is located between the closed orientation and the open orientation such that the hood 20 is prevented from moving upward to the open orientation by the hook shape of the first end 46 of the hook portion 40 of the latch lever 26.

Figure 21:
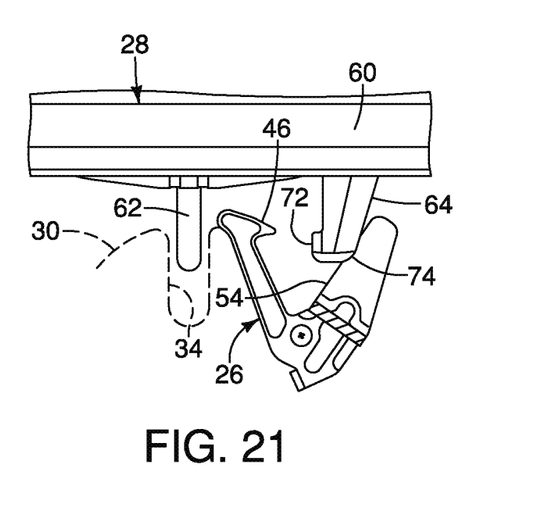
FIG. 21 is a third schematic view of the hood, the latch mechanism and the striker assembly depicting a further step for opening the hood, showing the latch lever moved away from the hood catching orientation to the hood releasing orientation allowing the hood and the secondary striker member to move upward in accordance with the exemplary embodiment.
Figure 22:
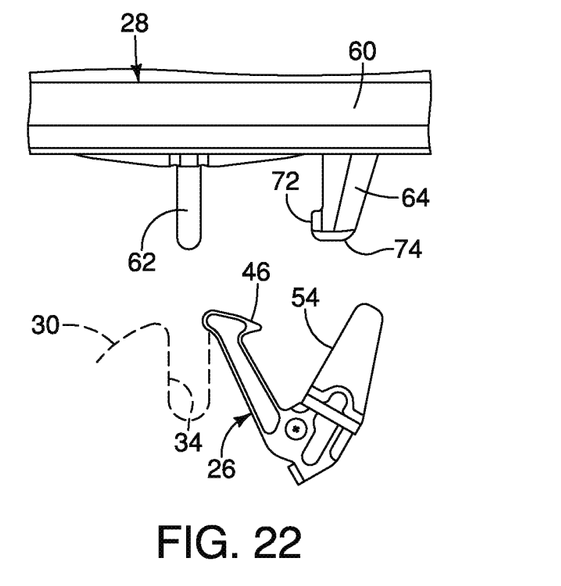
FIG. 22 is a fourth schematic view of the hood, the latch mechanism and the striker assembly showing the hood moved upward toward the open position in accordance with the exemplary embodiment.

As shown in FIG. 21, the technician or vehicle operator reaches under to hood 20 and operates the lever portion 42 of the latch lever 26 by pushing the second end 48 to the left, relative to FIG. 21. Pushing the lever portion 42 to the left moves the first end 46 of the hook portion 40 out of the hood catching orientation to the hook release orientation. In other words, the first end 46 is moved out of the hollowed area 70 of the secondary striker member 64, thereby allowing the hood 20 to move upward to the open position, as shown in FIG. 22.

It should be understood from the drawings and the description herein that the cam member 44 can be fixed to the lever portion 42 of the latch lever 26 by, for example, welding techniques. Further, the cam member 44 can be integrally formed with the hook portion and the lever portion 42 of the latch lever 26 as a single unitary monolithic unit.

The various elements of the vehicle 10 (other than the latch mechanism 24 and the latch lever 26) are conventional components that are well known in the art. Since such elements are are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle hood lever assembly. Accordingly, these terms, as utilized to describe the present invention should be interpreted relative to a vehicle equipped with the vehicle hood lever assembly.

The term "configured" as used herein to describe a component, section or part of a device includes structure that is constructed and/or assembled to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle hood lever assembly comprising:
a latch mechanism having a latching member movable between a hood locking orientation and a hood unlocking orientation;
a latch lever attached to the latch mechanism at a location spaced apart from the latching member and being movable between a hood catching orientation and a hood release orientation, the latch lever having a first end, a second end and a cam member that extends from an area of the latch lever between the first end and the second end; and
a striker structure having a main striker member and a secondary striker member, the secondary striker member being spaced apart from the main striker such that with the striker structure being moved toward the latch mechanism a surface of the secondary striker member contacts a portion of the latch lever moving the latch lever from the hood release orientation to the hood catching orientation, and in response to continued movement of the striker structure toward the latch mechanism the main striker member is configured to engage the latching member and be restrained against further movement with the latching member being moved into the hood locking orientation;
the latch mechanism including a support plate formed with a slot with the latching member being attached to the support plate such that with the latching member in the hood releasing orientation, the main striker is movable within at least a portion of the slot, and with the latching member in the hood locking orientation, the main striker being held in a fixed position within the slot by the latching member, the first end of the latch lever having a hook shape that is dimensioned to engage the secondary striker member with the latch lever in the hood catching orientation.

2. The vehicle hood lever assembly according to claim 1, wherein
the latch lever has a first end, a second end and a cam member that extends from an area of the latch lever between the first end and the second end.

3. The vehicle hood lever assembly according to claim 2, wherein
the first end of the latch lever has a hook shape that is dimensioned to engage the secondary striker member with the latch lever in the hood catching orientation.

4. The vehicle hood lever assembly according to claim 3, wherein
the second end of the latch lever extends in a vehicle forward direction with the latch mechanism installed to the vehicle body structure.

5. The vehicle hood lever assembly according to claim 4, wherein
the cam member extends in a direction parallel to the first end and perpendicular to the second end of the latch lever.

6. The vehicle hood lever assembly according to claim 1, wherein
the cam member is attached to the latch lever via mechanical fasteners.

7. The vehicle hood lever assembly according to claim 1, wherein the cam member is attached to the latch lever via welding techniques.

8. The vehicle hood lever assembly according to claim 1, wherein
the latch mechanism includes a support plate with the latching member attached to the support plate for pivoting movement about a first pivot pin; and
the latch lever attached to the support plate for pivoting movement about a second pin spaced apart from the first pivot pin.

9. The vehicle hood lever assembly according to claim 1, wherein
the latch mechanism is configured to attach to a vehicle body structure that includes a hood movable between an open position and a closed position relative to the vehicle body structure, and
the striker structure is configured to attach to the hood for movement therewith such that the main striker and the secondary striker member move toward the latch mechanism as the hood is moved from the open position toward the closed position.

10. The vehicle hood lever assembly according to claim 1, wherein
with the first end of the latch lever engaging the secondary striker member in the hood catching orientation, the hood is located between the closed orientation and the open orientation such that the hood is prevented from moving upward to the open orientation by the hook shape of the first end.

11. The vehicle hood lever assembly according to claim 1, wherein
the second end of the latch lever extends in a vehicle forward direction with the latch mechanism installed to the vehicle body structure.

12. The vehicle hood lever assembly according to claim 11, wherein
the cam member extends in a direction parallel to the first end and perpendicular to the second end of the latch lever.

13. The vehicle hood lever assembly according to claim 1, wherein
the cam member is attached to the latch lever via mechanical fasteners.

14. The vehicle hood lever assembly according to claim 1, wherein
the cam member is attached to the latch lever via welding techniques.

15. The vehicle hood lever assembly according to claim 1, wherein
the latch mechanism includes a support plate with the latching member attached to the support plate for pivoting movement about a first pivot pin; and
the latch lever attached to the support plate for pivoting movement about a second pin spaced apart from the first pivot pin.

16. The vehicle hood lever assembly according to claim 1, wherein
the latch mechanism is attached to the vehicle body structure at a location adjacent to an engine compartment defined within the vehicle body structure.

17. The vehicle hood lever assembly according to claim 1, wherein
the latch mechanism includes a support plate formed with a slot with the latching member being attached to the support plate such that with the latching member in the hood releasing orientation, the main striker is movable within at least a portion of the slot, and with the latching member in the hood locking orientation, the main striker is held in a fixed position within the slot by the latching member.

* * * * *